(12) United States Patent
Pepe et al.

(10) Patent No.: US 7,686,643 B2
(45) Date of Patent: Mar. 30, 2010

(54) METHOD AND APPARATUS FOR VISUAL INDICATION IN CABLE NETWORK SYSTEMS

(75) Inventors: Paul John Pepe, Clemmons, NC (US); Tony E. Beam, Belews Creek, NC (US)

(73) Assignee: Tyco Electronics Corporation, Middletown, PA (US)

( * ) Notice: Subject to any disclaimer, the term of this patent is extended or adjusted under 35 U.S.C. 154(b) by 112 days.

(21) Appl. No.: 11/901,543

(22) Filed: Sep. 18, 2007

(65) Prior Publication Data
US 2009/0075516 A1    Mar. 19, 2009

(51) Int. Cl.
*H01R 3/00* (2006.01)
(52) U.S. Cl. ........................ 439/490; 439/489
(58) Field of Classification Search .......... 439/488–491
See application file for complete search history.

(56) References Cited

U.S. PATENT DOCUMENTS

| | | | |
|---|---|---|---|
| 5,704,802 A * | 1/1998 | Loudermilk | 439/490 |
| 6,120,318 A * | 9/2000 | Reed et al. | 439/490 |
| 6,688,910 B1 | 2/2004 | Macauley | |
| 6,802,735 B2 | 10/2004 | Pepe et al. | |
| 7,014,500 B2 | 3/2006 | Belesimo | |
| 7,070,459 B2 * | 7/2006 | Denovich et al. | 439/719 |
| 7,153,142 B2 | 12/2006 | Shifris et al. | |
| 7,217,152 B1 * | 5/2007 | Xin et al. | 439/490 |
| 7,479,032 B2 * | 1/2009 | Hoath et al. | 439/540.1 |
| 2003/0073343 A1 | 4/2003 | Belesimo | |
| 2006/0262727 A1 | 11/2006 | Caveney | |
| 2006/0271338 A1 | 11/2006 | Haggay et al. | |
| 2009/0053923 A1 * | 2/2009 | Navarro et al. | 439/489 |

FOREIGN PATENT DOCUMENTS

| | | |
|---|---|---|
| GB | 2 347 751 | 9/2000 |
| GB | 2 347 752 | 9/2000 |

* cited by examiner

*Primary Examiner*—Michael C Zarroli

(57) ABSTRACT

A cable network system includes a distribution assembly having a plurality of visual indicators mounted thereto, and a jack assembly removably coupled to the distribution assembly. The jack assembly has a plurality of jacks configured to receive cables of the cable network system therein. The visual indicators provide an indication of a status of a respective one of the jacks, and the jack assembly is removable from the distribution assembly while the visual indicators remain mounted to the distribution assembly.

20 Claims, 5 Drawing Sheets

METHOD AND APPARATUS FOR VISUAL INDICATION IN CABLE NETWORK SYSTEMS

BACKGROUND OF THE INVENTION

The subject matter herein relates generally to cable network systems, and more particularly, to methods and apparatus for separately controlling a visual indication system for cable network systems.

Cable network systems are in use today in various electronics applications, such as telecommunications, data transmission, networking, video and the like. The cable network systems route cables from a central distribution location, such as a distribution frame or patch panel, to many remote locations, such as an individual workstation. The cables are typically routed from terminal jacks at respective remote locations to the distribution location, where the cables are plugged into individual terminal jacks at the patch panel. It is often necessary to identify individual cables or circuits that extend between the two locations, to be sure that the cable is plugged into the correct jack at the distribution location. Problems exists within conventional cable network systems of properly identifying cable network circuits within the cable network system. For example, particular cables within the cable network system need to be located or identified from the large numbers of cables within the system for proper routing or rerouting within the network system. Additionally, particular jacks at the patch panel need to be located or identified from the large number of jacks for proper routing or rerouting of the cables within the network system. Properly identifying cable network circuits can be a time consuming and difficult task.

The most commonly used prior art method for identifying the corresponding cables and/or jacks requires two workers. One worker is stationed at the distribution location, where one end of the cable is terminated, and the other worker is stationed at the remote location to be identified. In this context, "identify" means to determine which of the many cables connected to the patch panel corresponds to the same cable connected to the terminal jack at the remote location. The worker at the remote location, using a tone or signal generating apparatus, applies a test signal to the terminal jack, which enters the cable connected at the remote location. Once the signal generator is connected, the worker at the patch panel sequentially scans each of the terminations at the distribution location until the correct cable is identified. This process is repeated until all of the network cables are identified. This process is very labor intensive, involves a great deal of trial and error, and is time consuming.

At least some known systems provide a visual indicator at the patch panel that identifies the correct termination. Thus the workers can rapidly identify the appropriate termination. However, these known system use permanently connected or built-in devices that are hard-wired to the jacks at the patch panel. Such devices are expensive to manufacture, and require the design and installation of a great deal of circuitry within the patch panel at the distribution location. Additionally, such devices lack the ability to quickly and easily repair or replace the jacks at the patch panel.

A need remains for methods and apparatus for identifying cable network circuits within a cable networking system that are inexpensive, fast, and/or simple to use.

BRIEF DESCRIPTION OF THE INVENTION

In one embodiment, a cable network system is provided that includes a distribution assembly having a plurality of visual indicators mounted thereto, and a jack assembly removably coupled to the distribution assembly. The jack assembly has a plurality of jacks configured to receive cables of the cable network system therein. The visual indicators provide an indication of a status of a respective one of the jacks, and the jack assembly is removable from the distribution assembly while the visual indicators remain mounted to the distribution assembly.

Optionally, a light bar may be mounted to the distribution assembly, wherein the light bar includes a circuit board and the visual indicators are mounted to the circuit board. A wire harness may be connected to the light bar and transmit signals to the light bar to activate the visual indicators. Optionally, the status of the visual indicators may identify at least one of a jack location into which a plug is to be plugged, a jack location from which a plug is to be removed, and a connectivity status of the jack. The cable may be configured to interconnect with a particular one of the jacks, such that the visual indicators are configured to identify the particular jack configured to receive the cable.

In another embodiment, a cable network system is provided that includes a distribution assembly having a front connectivity interface configured for mating with cables of the cable network system, the distribution assembly includes an opening. A light bar is mounted to the distribution assembly, wherein the light bar has a plurality of visual indicators visible at the front connectivity interface. A jack assembly is removably received in the opening, wherein the jack assembly has a housing and a plurality of jacks mounted to the housing. The jacks are configured to receive cables, and each of the jacks have at least one of the visual indicators associated therewith. A wire harness is electrically coupled to the light bar, wherein the wire harness is configured to activate the individual visual indicators based on a status of the associated jack.

In a further embodiment, a method is provided of visually identifying a jack location within a cable network system. The method includes providing a distribution assembly having a frame and a jack assembly removably mounted to the frame, wherein the jack assembly has a plurality of jacks configured to receive cables of the cable network system therein. The method also includes mounting a light bar to the frame, wherein the light bar includes visual indicators that provide an indication of a status of a respective one of the jacks.

DETAILED DESCRIPTION OF THE INVENTION

Figure 1:
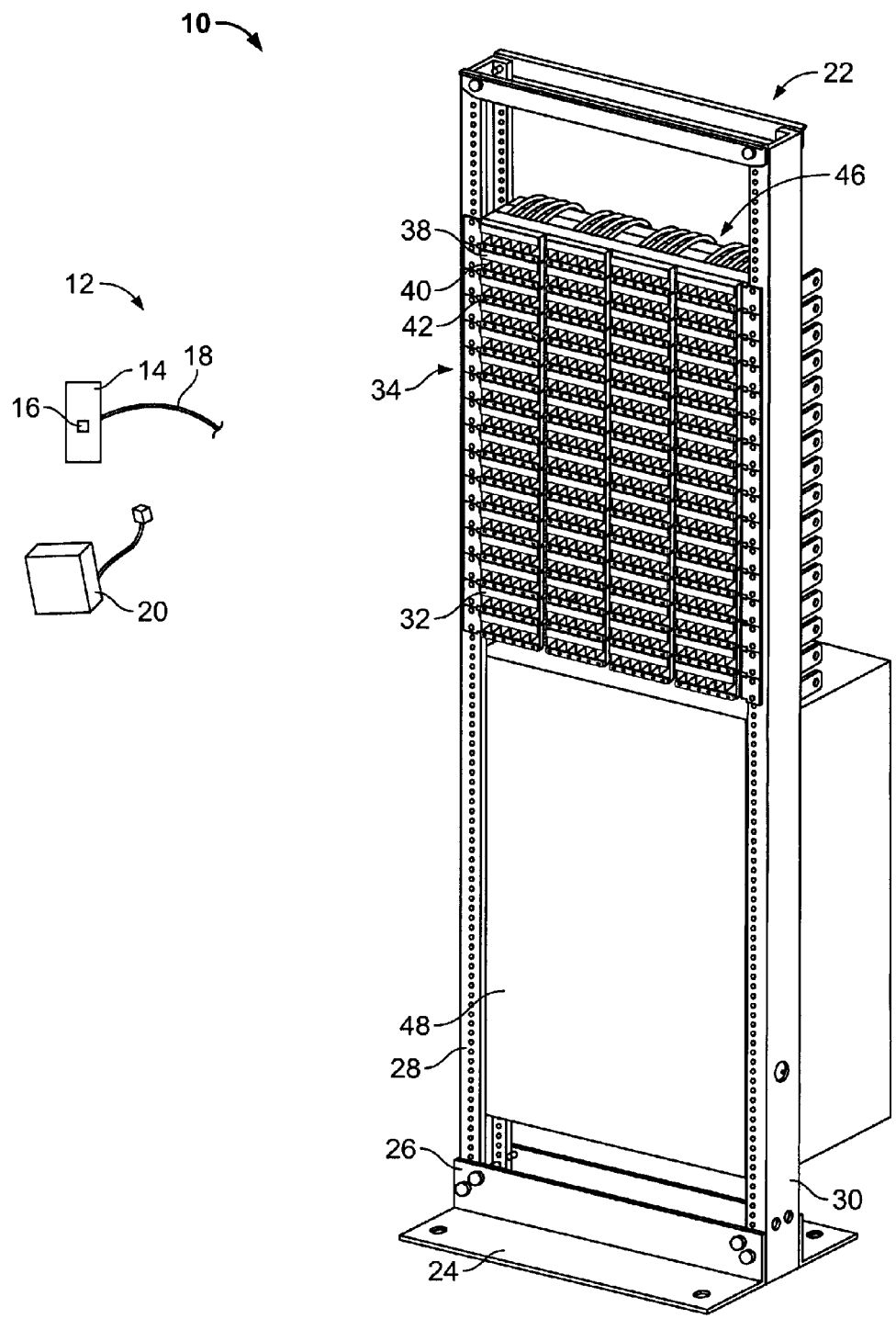
FIG. 1 illustrates a distribution assembly of a cable network system having patch panel assemblies formed in accordance with an exemplary embodiment.

FIG. 1 illustrates a distribution assembly 10 of a cable network system 12 having patch panel assemblies that are formed in accordance with an exemplary embodiment. The cable network system 12 is represented schematically in FIG. 1 as including the distribution assembly 10, a remote location, represented in FIG. 1 as a wall outlet 14 having a jack assembly 16, and a cable 18 routed from the remote location to the distribution assembly 10. The cable network system 12 may be used in various electronics applications, such as telecommunications, data transmission, networking, video and the like. While a single remote location and corresponding cable 18 is illustrated in FIG. 1, the cable network system 12 could include any number of remote locations and corresponding cables 18. The subject matter described herein relates to methods and apparatus for identifying cable network circuits within the cable network system 12. To that end, a testing device 20 may be provided at the remote location for transmitting a test signal along the cable 18 to the distribution assembly 10.

As illustrated in FIG. 1, the distribution assembly 10 represents a central location to which the cables 18 of the cable network system 12 are routed. It is noted that the distribution assembly 10 illustrated in FIG. 1 is merely illustrative of an exemplary system/component utilized within the cable network system 12, and other types of systems/components may similarly be used. For example, the distribution assembly 10 illustrated in FIG. 1 represents a distribution frame 22 having a plurality of patch panel assemblies 32 mounted thereto, however, other types of cable network components may be used rather than the distribution frame. Additionally, the distribution assembly 10 may include a single patch panel assembly 32 in some embodiments. The frame 22 may be mounted to the floor and/or ceiling of an applications room, and generally includes a base plate 24 having an upper flange 26 that is joined to legs 28 and 30.

A plurality of patch panel assemblies 32 are arranged in a stacked configuration forming a cable interface 34 of the distribution assembly 10. In the illustrated embodiment, the patch panel assemblies 32 are generally planar, however, other types of patch panels may be used, such as curved or angled patch panels, or patch panels having a generally V-shape. The patch panel assemblies 32 are securely attached to the frame 22, such as using fasteners.

The patch panel assemblies 32 include a plurality of openings 36 (shown in FIG. 4) for receiving electronic modules, such as jack assemblies 38 therein. In an exemplary embodiment, the jack assemblies 38 include multiple modular jacks 40 (e.g. RJ45 jacks) along a front connectivity interface 42 of the patch panel assembly 32. Each jack 40 is adapted to receive a plug for conveying a data stream. For example, a cable having plugs may interconnect respective ones of the jacks 40. Cables are also connected to the jack assemblies 38 at a rear connectivity interface 46 (shown in FIG. 2) of the jack assemblies 38. The patch panels may be the cables 18 routed to the remote location. The cables are routed generally behind the patch panel assemblies 32. In the illustrated embodiment, the cables are routed to an equipment system 48 (such as a switching network), although the system 48 may be entirely removed or may be located in a different location.

Figure 2:
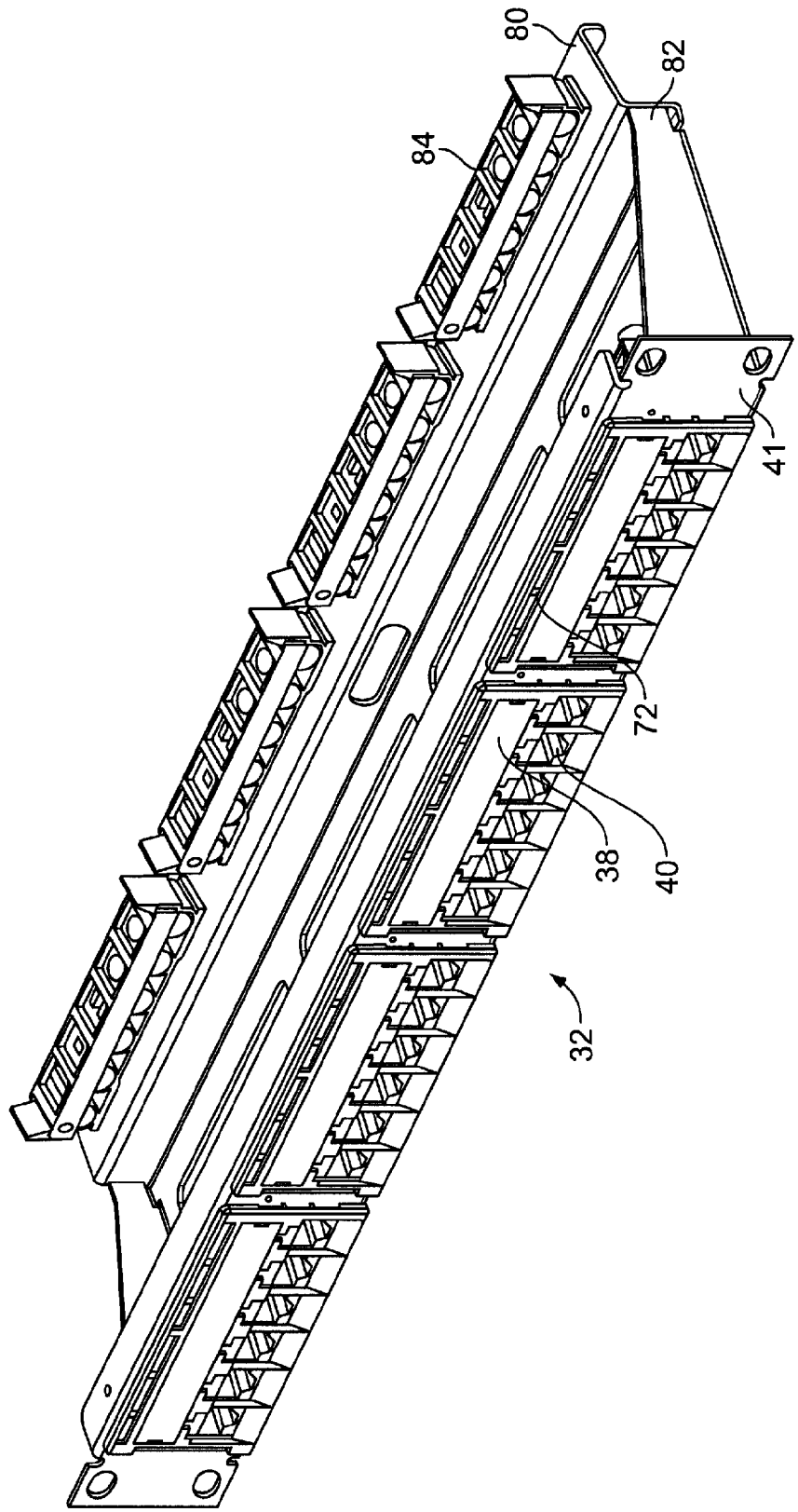
FIG. 2 is a front perspective view of a patch panel assembly shown in FIG. 1 illustrating a plurality of jack assemblies for use with the distribution assembly.
Figure 3:
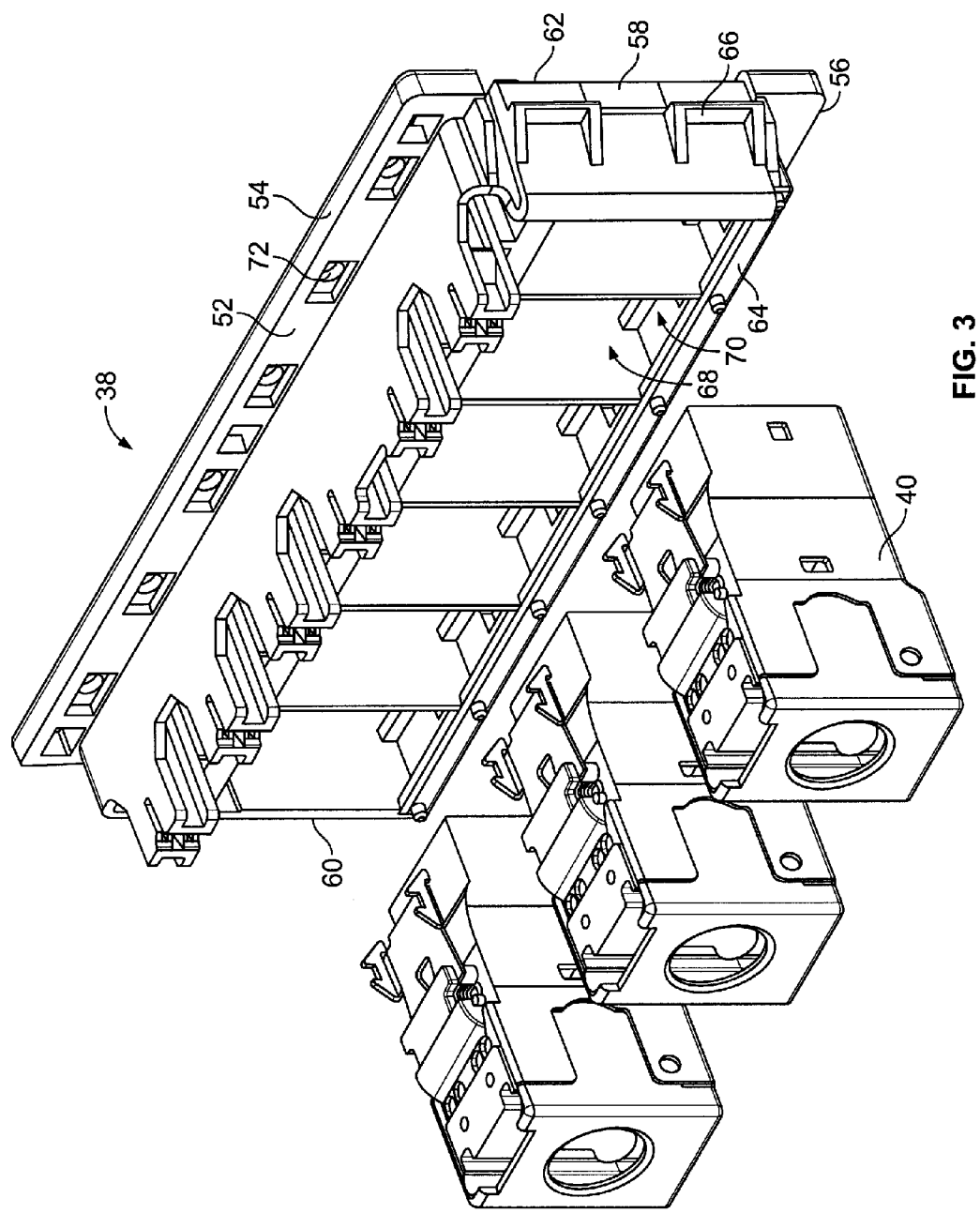
FIG. 3 is a rear perspective view of one of the jack assemblies shown in FIG. 2.

FIG. 2 is a front perspective view of the patch panel assembly 32 having a frame 41 and a plurality of jack assemblies 38 loaded therein. FIG. 3 is an exploded view of one of the jack assemblies 38. The jack assemblies 38 simultaneously mount a plurality of modular jacks 40 to the patch panel assembly 32. The modular jacks 40 are configured to receive the cables 18 (shown in FIG. 1) and may be shielded or unshielded. In the illustrated embodiment of FIG. 3, the modular jacks 40 are shielded (e.g. metalized) and are bonded (e.g. electrically connected) to a grounded component, such as the patch panel frame 41 by a metallic path provided on the jack assembly 38.

The jack assemblies 38 are mounted within the openings 36 (shown in FIG. 4) of the patch panel assembly 32. As illustrated in FIG. 3, each jack assembly 38 includes a housing 52 that includes a dielectric body fabricated from a dielectric material, such as a plastic material. The housing 52 includes a top 54, bottom 56, sides 58 and 60, a front 62 and a rear 64. Latches 66 are used to mount the jack assembly 38 to the patch panel assembly 32. The housing 52 also includes a plurality of jack openings 68 at the rear 64 that receive the modular jacks 40 therein. The jack openings 68 are adapted to provide the proper opening dimensions for holding the modular jacks 40 therein. While only three modular jacks 40 are illustrated in FIG. 3, it is realized that the same number of modular jacks 40 and jack openings 68 may be provided. The jack openings 68 provide access to jack cavities 70 that are sized and shaped to receive the modular jacks 40. In the illustrated embodiment, the jack cavities 70 are generally box-shaped, but may be shaped differently if the modular jacks 40 are shaped differently. In an exemplary embodiment, the jack assembly 38 includes a plurality of windows 72 along the front 62 that extend therethrough. The windows 72 allow an operator to visually see the patch panel assembly 32 behind the jack assembly 38. In an exemplary embodiment, each window 72 is substantially centered above, and associated with a corresponding jack opening 68.

Returning to FIG. 2, a cable support bar 80 may extend from a rear 82 of the frame 41. The cable support bar 80 supports the cables 44 (removed for clarity in FIG. 2, but shown in FIG. 1) extending from the rear of the jack assemblies 38. The cable support bar 80 includes cable holders 84 that organize and hold the cables 44. Optionally, the patch panel assembly 32 may be provided without the cable support bar 80. FIG. 2 also illustrates that, in an exemplary embodiment, each of the windows 72 are aligned with respective ones of the modular jacks 40. The windows 72 provide visual access of the patch panel assembly 32 behind the jack assemblies 38 when the jack assemblies 38 are loaded into the openings 36 of the frame 41. The windows 72 are used in the visual identification of particular ones of the modular jacks 40 that are of interest to the operator, as will be described in further detail below.

Figure 4:
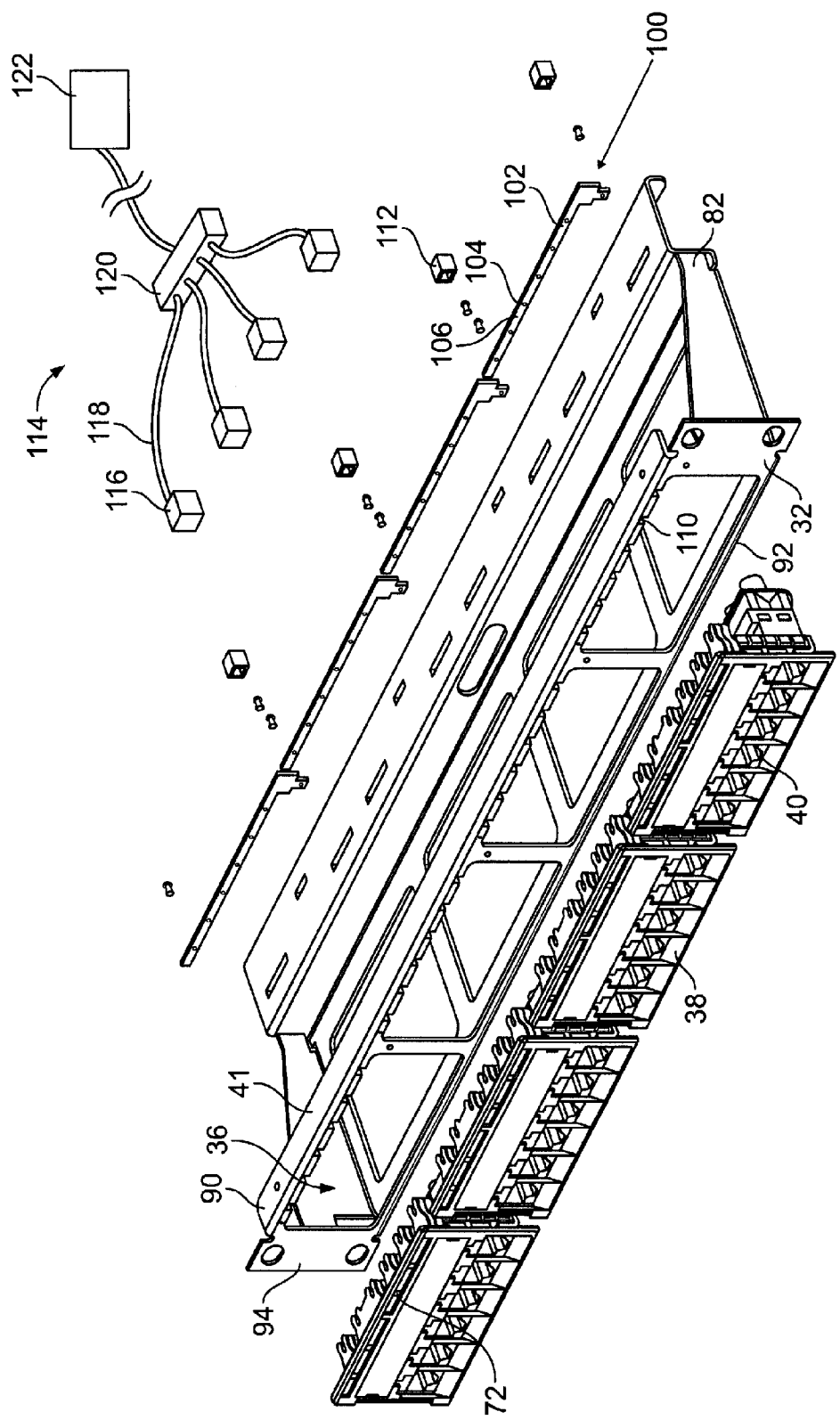
FIG. 4 is a front exploded view of the patch panel assembly shown in FIG. 2.

FIG. 4 is a front exploded view of the patch panel assembly 32 having the frame 41, jack assemblies 38 and a light bar 100. The frame 41 includes a top 90, a bottom 92, a front 94 and the rear 82. The openings 36 extend between the front and rear 94, 82 and receive the jack assemblies 38.

In an exemplary embodiment, a plurality of light bars 100 are provided for attachment to the frame 41. The light bars 100 include a substrate, such as a circuit board 102, and a plurality of visual indicators 104 mounted to a front surface 106 of the circuit board 102. In an exemplary embodiment, the visual indicators 104 are light emitting diodes (LEDs), and may be referred to hereinafter as LEDs 104. In the illustrated embodiment, six visual indicators 104 are provided on each circuit board 102. The visual indicators 104 correspond to the six modular jacks 40 of each jack assembly 38. The visual indicators 104 generally visually identify a status of a corresponding one of the modular jacks 40.

The light bars 100 may be attached to either the front 94 or the rear 82 of the frame 41, and may be affixed using fasteners, such as rivets 108, or other known fasteners or adhesives. In the illustrated embodiment, the light bars 100 are attached to the rear 82 of the frame 41 and the visual indicators 104 are aligned with visual indication ports 110 in the frame 41 such that the visual indicators 104 are visible from the front 94 of the patch panel assembly 32. Additionally, when the jack assemblies 38 are mounted within the openings 36, the windows 72 are substantially aligned with the visual indication ports 110 such that the visual indicators 104 can be viewed through the windows 72. In an alternative embodiment, rather than individual light bars 100 corresponding to individual jack assemblies 38, a single light bar 100 may be used for multiple jack assemblies 38.

In an exemplary embodiment, a connector 112, such as a plug or receptacle, is electrically and mechanically connected to each circuit board 102. A wire harness 114 is provided including a plurality of mating connectors 116 at ends of wires 118. The wires 118 are routed back to a drive connector 120, which is interconnected with a controller or driver 122. The driver 122 includes a processor or other logic for sending signals, such as activation signals, along the wire harness 114 in a controlled manner. The signals may be sent in response to certain activation conditions, as will be described in further detail below. In an exemplary embodiment, the drive connector 120 is coupled to a portion of the patch panel assembly 32, such as the cable support bar 80 and the wires 118 are routed along the patch panel assembly 32 between the cable support bar 80 and the respective connectors 112. As such, the signals sent by the driver 122 may be transmitted to the connectors 112 at each circuit board 102. In an alternative embodiment, the drive connector 120 and driver 122 may be part of the same device and located remote from the patch panel assembly 32 with the wires 118 extending between the drive connector 120 and the respective connectors 112.

In operation, the mating connectors 116 are connected to corresponding ones of the connectors 112 for controlling an operation state of each of the visual indicators 104. For example, an activation signal may be sent from the driver 122 to the drive connector 120, which then transmits the signals along the wire 118 of the wire harness 114 to the respective light bar 100. The signal transmitted to the light bar 100 causes at least one of the visual indicators 104 to light. The visual indicators 104 may be electrically connected to the connector 112 by traces or wires on the circuit board 102. In an exemplary embodiment, the driver 122 sends the activation signal based on an activation condition.

In an exemplary operation, and with reference back to FIG. 1, when the testing device 20 is plugged into one of the wall outlets 14, a signal is transmitted along the cable 18 to the distribution assembly 10. The test signal is transmitted to the corresponding modular jack 40, such as from the equipment system 38. Such signal may be processed by the driver 122, or another component associated with the driver 122, and an activation signal is sent to visually identify the modular jack 40 location through which the test signal passed. The activation signal lights up the visual indicator 104 associated with the modular jack 40 location. As such, the operator can visually identify the jack 40 associated with the particular remote location that received the test signal. Such information may be useful for the operator to note the respective jack module 40 corresponding to the remote location for future reference. Such information may also be useful in interconnecting the jack module 40 with a different jack module 40, which may be identified by sending a different activation signal from the driver 122 to the other modular jack 40 location.

In one exemplary embodiment, the driver 122 may send a first signal to a first jack module 40 location, which may cause the respective visual indicator 104 to light a certain color or flash at a predetermined rate. The driver 122 may send a second signal to a second jack module location, which may cause the respective visual indicator 104 to light a different color or flash at a different rate. A cable having corresponding plugs may be used to interconnect the jacks 40 that receive the first and second signals. As such, the distribution assembly 10 may provide visual identification of cable network circuits of interest within a cable networking system. The distribution assembly 10 may also be used to visually identify other events, such as a connection status of a particular modular jack 40, and the like in alternative embodiments.

Figure 5:
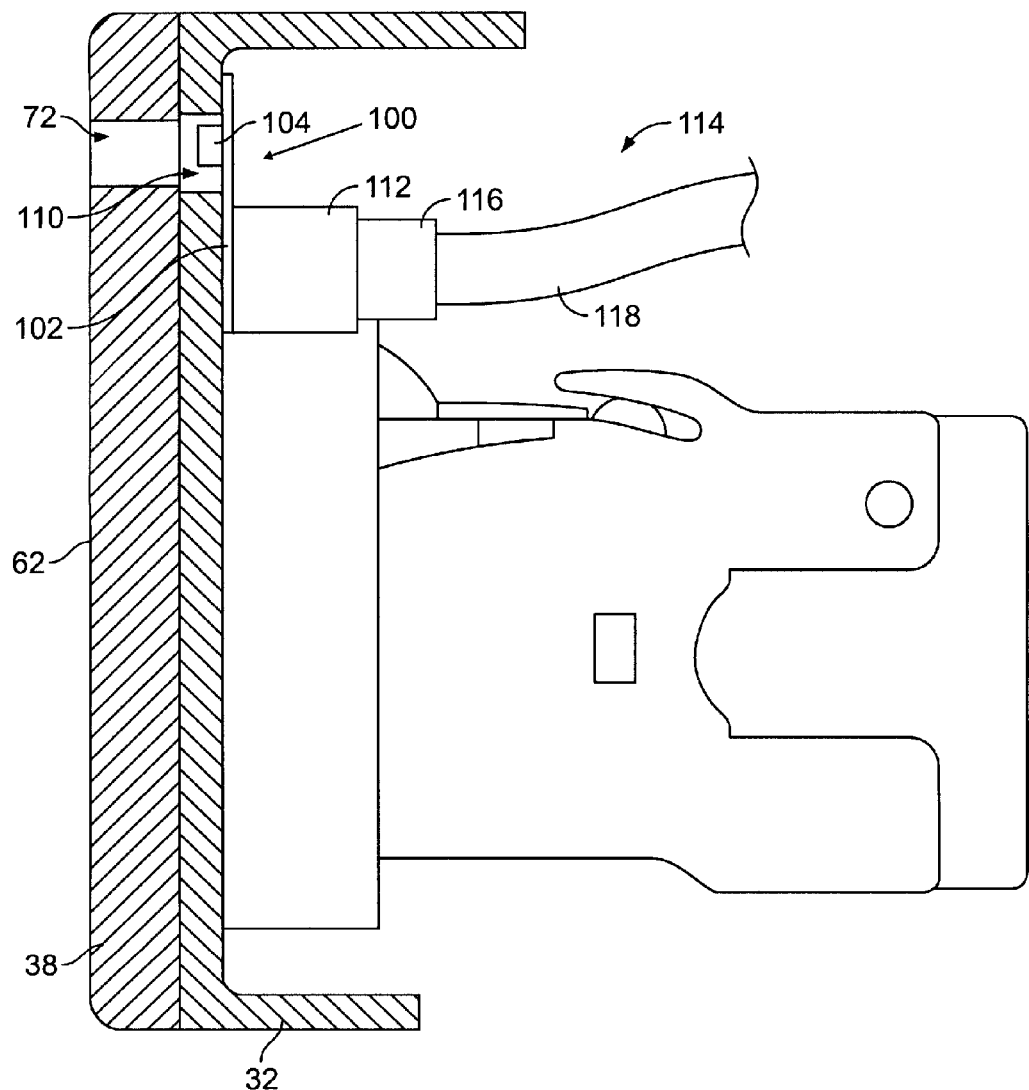
FIG. 5 is a partial cutaway side view of the patch panel assembly shown in FIG. 2.

FIG. 5 is a partial cutaway side view of the patch panel assembly 32. The jack assembly 38 is illustrated in a mounted position with respect to the frame 41. A portion of the frame 41 and the jack assembly 38 has been cutaway and is shown in cross-section, namely a portion proximate the visual indicator 104, such that one of the visual indication ports 110 and windows 72 are illustrated. As shown, when the jack assembly 38 is mounted to the frame 41, the visual indication port 110 and window 72 are aligned with the visual indicator 104 such that the visual indicator 104 is visible from the front 62 of the jack module 38. The light bar 100 is permanently coupled to the frame 41 and positions the visual indicator 104 to correspond with at least one of the modular jacks 40 of the jack assembly 38. The light bar 100 is wired into the frame 41 using the wire harness 114. Because the visual indicators are mounted to the frame 41 and not the individual jack 40 or even the jack assembly 38, the jack assembly 38 may be removed from the patch panel assembly 32 independent of visual indicator 104 and the wire harness 114.

FIG. 5 illustrates the connectors 112 and 116 in a mated position, and a portion of the wire 118 extending from the connector 116. Activation signals are transmitted to the circuit board 102 via the wire 118 and connector 116, to activate the visual indicator 104.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A cable network system comprising:
    a distribution assembly having a patch panel having a plurality of openings, the patch panel having a plurality of visual indicators mounted thereto; and a plurality of jack assemblies received in the openings and removably coupled to the patch panel of the distribution assembly independently of the visual indicators, each jack assembly having a plurality of jacks configured to receive cables of the cable network system therein;

wherein the visual indicators provide an indication of a status of a respective one of the jacks, and wherein the jack assembly is removable from the distribution assembly while the visual indicators remain mounted to the distribution assembly.

2. The system of claim 1, further comprising a light bar mounted to the distribution assembly wherein the visual indicators are mounted to the light bar, and further comprising a wire harness connected to a light bar and transmitting signals to the light bar to activate the visual indicators.

3. The system of claim 1, wherein the status of the visual indicators identifies at least one of a jack location into which a plug is to be plugged, a jack location from which a plug is to be removed, and a connectivity status of the jack location.

4. The system of claim 1, wherein the visual indicators are configured to identify which of the jacks are configured to receive a particular one of the cables of the cable network system.

5. The system of claim 1, wherein each of the cables are configured to be coupled to a wall outlet remote from the distribution assembly, and the wall outlet is configured to receive a test signal transmitted along the cable to the respective jack, the visual indicator identifying the location of the jack receiving the test signal.

6. The system of claim 1, wherein the patch panel includes a front surface and a rear surface, the system further comprising a light bar comprising a circuit board and the visual indicators mounted to the circuit board, the circuit board being mounted to the rear surface of the patch panel and the visual indicators extending from the circuit board such that the visual indicators are visible when viewed from the front surface of the patch panel, the jack assemblies being removably coupled to the patch panel independently of the light bar.

7. A cable network system comprising:
a distribution assembly having a light bar mounted to the distribution assembly, the light bar including a circuit board and visual indicators mounted to the circuit board; and
a jack assembly removably coupled to the distribution assembly, the jack assembly having a plurality of jacks configured to receive cables of the cable network system therein;
wherein the visual indicators provide an indication of a status of a respective one of the jacks,
and wherein the jack assembly is removable from the distribution assembly while the visual indicators remain mounted to the distribution assembly.

8. The system of clam 7, wherein the distribution assembly defines a patch panel having a plurality of openings for receiving a plurality of jack assemblies, the visual indicators being coupled to the patch panel, the jack assemblies being removably coupled to the patch panel independently of the visual indicators.

9. A cable network system comprising:
a distribution assembly having a front connectivity interface configured for mating with cables of the cable network system, the distribution assembly includes an opening;
a light bar mounted to the distribution assembly, the light bar having a plurality of visual indicators visible at the front connectivity interface;
a jack assembly removably received in the opening, the jack assembly having a housing and a plurality of jacks mounted to the housing, the jacks being configured to receive cables, and each of the jacks having at least one of the visual indicators associated therewith; and
a wire harness electrically coupled to the light bar, wherein the wire harness is configured to activate the individual visual indicators based on a status of the associated jack.

10. The system of claim 9, wherein the light bar includes a circuit board, the visual indicators are mounted to the circuit board, and the wire harness is electrically coupled to the circuit board for controlling the activation of the visual indicators.

11. The system of claim 9, wherein the light bar includes a circuit board and the visual indicators include light emitting diodes mounted to the circuit board.

12. The system of claim 9, wherein the light bar includes a first mating connector and the wire harness includes a second mating connector connected to the first mating connector.

13. The system of claim 9, wherein the distribution assembly includes a plurality of visual indication ports, the light bar being mounted to the distribution assembly such that the visual indicators are aligned with, and visible through, respective ones of the visual indication ports.

14. The system of claim 9, wherein the jack assembly housing has a plurality of windows, the visual indicators being visible through respective ones of the windows.

15. The system of claim 9, wherein the distribution assembly includes a rear portion generally opposed to the front connectivity interface, the light bar and the wire harness are mounted to the rear portion of the distribution assembly.

16. The system of claim 9, further comprising a driver, the wire harness being coupled to the driver and receives signals from the driver to transmit to the light bar, the signals relate to an operational status of the visual indicators.

17. The system of claim 9, further comprising multiple light bars mounted to the distribution assembly, the wire harness includes an electrical connector and a plurality of wires extending from the electrical connector to respective ones of the light bars.

18. A method of visually identifying a jack location within a cable network system, the method comprising:
providing a distribution assembly having a frame that includes a patch panel and a jack assembly removably mounted to the frame, wherein the jack assembly has a plurality of jacks configured to receive cables of the cable network system therein; and
mounting a light bar to the patch panel of the frame, wherein the light bar includes visual indicators that provide an indication of a status of a respective one of the jacks, the jack assembly being removable from the frame independently of the light bar.

19. The method of claim 18, wherein providing a jack assembly includes providing a jack assembly removably mounted to the patch panel of the frame, and wherein mounting a light bar includes mounting a light bar to the patch panel, wherein the light bar includes a circuit board having the visual indicators mounted to the circuit board.

20. The method of claim 18, further comprising connecting a wire harness to the light bar and the frame, wherein the wire harness transmits signals to the light bar to activate the visual indicators, and wherein the jack assembly is removable from the frame separate from the wire harness.

* * * * *